(12) United States Patent
Zhang

(10) Patent No.: US 6,558,837 B2
(45) Date of Patent: May 6, 2003

(54) BATTERY WITH SIDE FLANKING TERMINALS

(75) Inventor: Huanong Zhang, Wuhan Hubei (CN)

(73) Assignee: Xiongtao Power Supply Technology Co., Ltd., Shenzhen (CN)

( * ) Notice: Subject to any disclaimer, the term of this patent is extended or adjusted under 35 U.S.C. 154(b) by 194 days.

(21) Appl. No.: 09/767,065

(22) Filed: Jan. 22, 2001

(65) Prior Publication Data

US 2001/0012581 A1 Aug. 9, 2001

(30) Foreign Application Priority Data

Jan. 21, 2000 (CN) .................................. 00202810 U

(51) Int. Cl.⁷ .................. H01M 2/30; H01M 2/08; H01M 2/02
(52) U.S. Cl. .................. 429/179; 429/180; 429/177; 29/623.2
(58) Field of Search ................. 429/177, 179, 429/180, 185; 29/623.2

(56) References Cited

U.S. PATENT DOCUMENTS

| | | | | |
|---|---|---|---|---|
| 2,132,793 A | * | 10/1938 | Kyle ........................ 429/179 |
| 4,563,402 A | * | 1/1986 | Kobayashi et al. ..... 429/185 X |
| 4,898,796 A | * | 2/1990 | Furukawa et al. ...... 429/180 X |
| 5,599,641 A | * | 2/1997 | Ching, Jr. et al. ......... 429/179 |

\* cited by examiner

Primary Examiner—Stephen Kalafut
(74) Attorney, Agent, or Firm—Morgan & Finnegan, LLP

(57) ABSTRACT

A battery with side flanking terminals wherein the positive and negative terminals are fixed onto the opposite side walls of a casing and connect respectively to a positive and negative post. The battery may be sealed by main cover seal with an adhesive to the casing. The positive and negative terminals are connected respectively to the positive and negative posts through first and second slots located in main cover. The advantages provided by this invention is to prevent the possibility of short circuiting the battery caused by a fallen metal object on top of the battery to increase safety of operation. Further, the connection, space for storage and operation is reduced. Further, the battery may be sealed in a one step process.

9 Claims, 2 Drawing Sheets

BATTERY WITH SIDE FLANKING TERMINALS

INTRODUCTION

The present invention relates to the structure for a battery including a primary, a secondary, a fuel cell or a combination battery. In particular, it relates to the placement of the positive and negative terminals on the side wall(s) of the casing for a battery.

BACKGROUND OF THE INVENTION

Previously, batteries, such as the sealed lead-acid storage batteries, have a structure shown in FIG. 1. A sealed lead-acid storage battery comprises a casing 10', a main cover 60' and a top cover 90'. In the casing, positive and negative plates 31' and 42' are arranged alternatively with separators 21' therebetween. All of the positive plates 31' are connected in parallel to a positive post 35'. All the negative plates 42' are connected in parallel to a negative post 46'. The main cover 60' is fixed onto the casing 10' and sealed with an adhesive resin. The positive and negative posts 35' and 46' respectively go through openings 67' and 68' in the main cover 60' and are welded respectively to positive and negative terminal lugs 37' and 48', the lower part of which occupy larger areas than the posts for the terminals. An adhesive resin is used to fill in the gaps between openings 67' and 68' and the positive and negative terminals. The casing is filled with an electrolyte through an opening on the main cover which is then covered with a rubber safety valve 23'. One of the drawbacks of the prior art battery is that two steps are necessary to seal the battery: one to seal the main cover 60' to the casing and the second to seal openings for the terminal lugs 37' and 48' on the main cover 60'. A second drawback is that terminals 37' and 48' located on the main cover and top cover 90' are prone to be short-circuited by a metal object which may have fallen onto the top of the battery. Further, connections to the battery can only be made on the top of the battery, and extra space is necessary to accommodate the terminals.

SUMMARY OF THE INVENTION

To overcome the above mentioned drawbacks of the prior art batteries, a battery with terminals positioned on the side wall(s) of the casing below the main cover for the battery is provided. By placing the terminals on the side walls of the casing, the possibility of being short circuited by fallen metal objects is eliminated to increase safety in operation, the connections to the battery is easier to make and the space needed for storage of the battery or installation is reduced. At the same time, the two steps necessary for sealing the battery is reduced to one step.

To achieve these goals, (1) The positive and negative terminals are fixed on the opposite side wall(s) of the casing and respectively connected to the positive and negative posts which are connected to the positive and negative terminals through slots located in the side wall(s) of the main cover; (2) After the plates and terminals are properly connected, the main cover can then be fixed onto the casing and sealed thereto with an adhesive.

The invention is also directed to a method of manufacturing a battery with side flanking terminals. The method comprises placing the positive and negative terminals in the side wall(s) of a battery and connecting the terminals respectively to the positive and negative posts to which the positive and negative plates are respectively connected in parallel arrangements. Then sealing the main cover onto the casing with an adhesive.

DETAILED DESCRIPTION OF THE INVENTION

Figure 1:
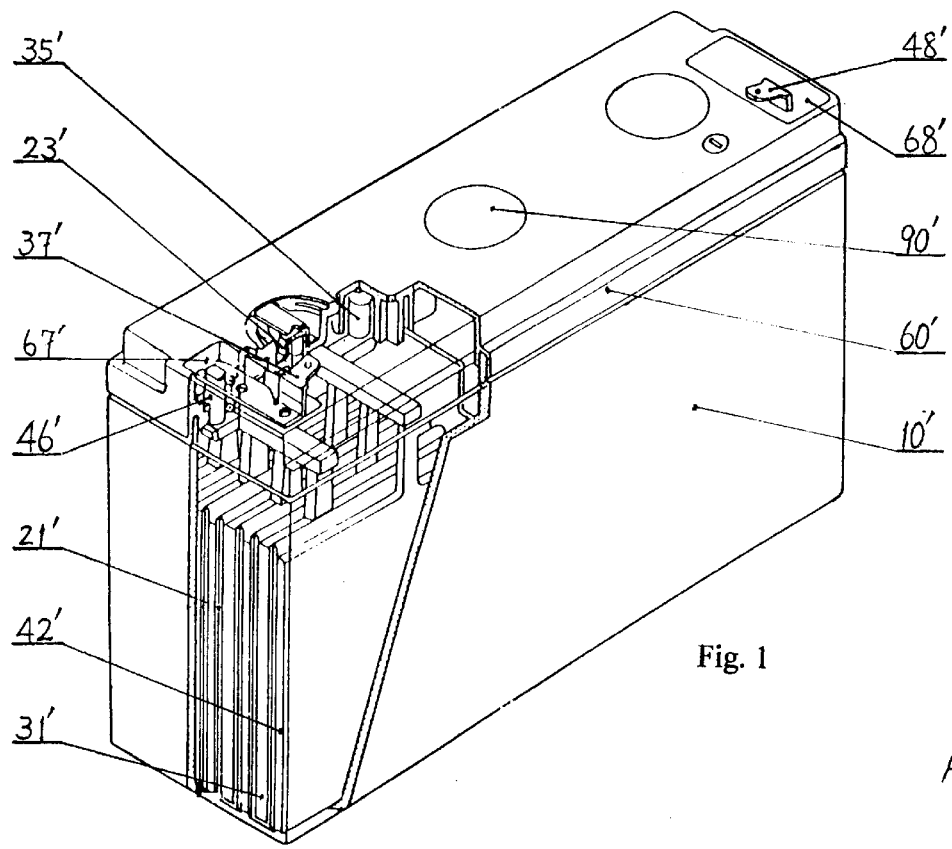
FIG. 1: shows the electrode plates assembly and connections of a lead-acid storage battery in the prior art.
Figure 3:
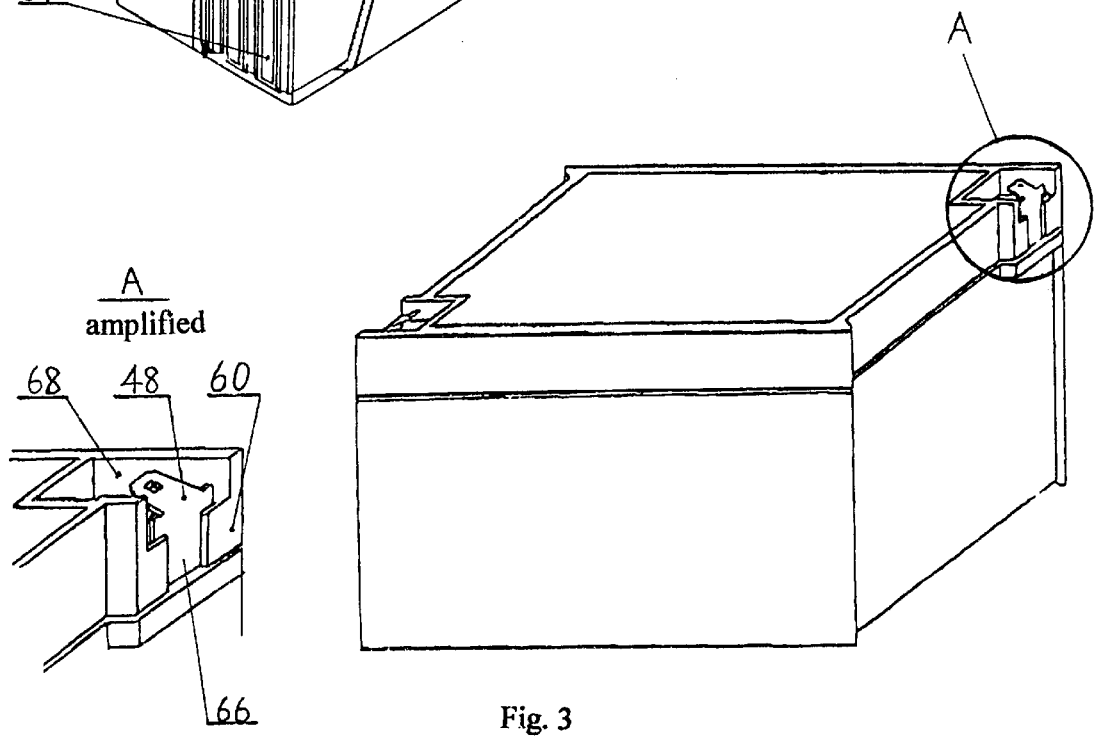
FIG. 3: is an enlarged view of a side flanking terminal positioned on the side walls of the main cover of a battery according to the present invention.
Figure 2:
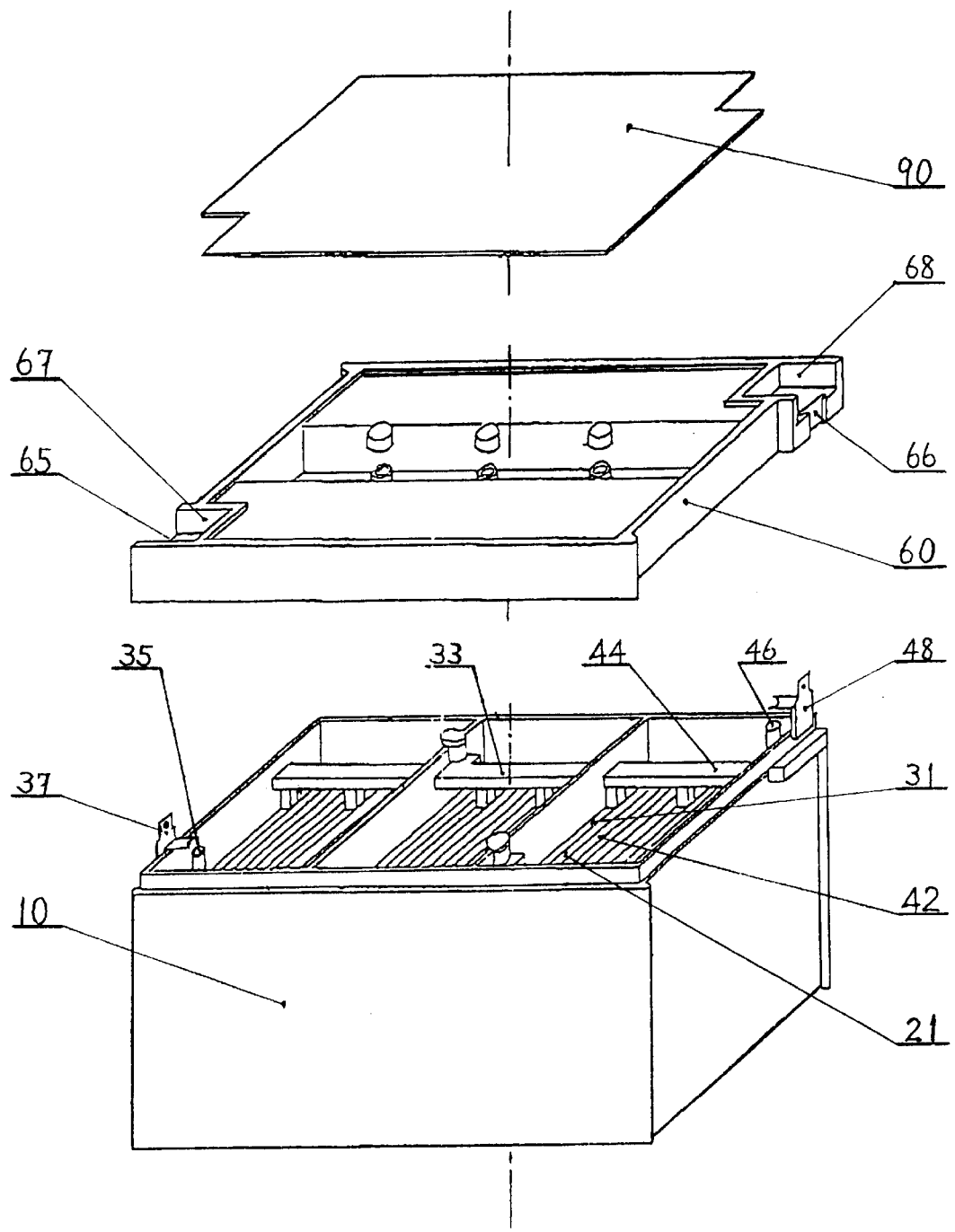
FIG. 2: is an exploded view of a battery with side flanking terminals of the present invention showing the placement of the positive and negative terminals and the positive and negative posts.

A preferred embodiment of the invention, a battery with side flanking terminals, is shown in FIGS. 2–3. The battery comprises a casing 10 with a main cover provided with at least one opening for introducing an electrolyte, wherein there are arranged a set of positive electrode plates 31 and a set of negative electrode plates 42. Each positive plate is alternated with a negative plate and separated therefrom by a separator 21. All of the positive plates 31 are connected in parallel to a positive post 35 and all of the negative plates 42 are connected in parallel to a negative post 46.

A positive terminal 37 and a negative terminal 48 are fixed onto the opposite side walls of casing 10. The positive 37 and negative 48 terminals are connected respectively to a positive post 35 and a negative post 46, with each post passing through a slot provided on the main cover and positioned to correspond to the position of the terminals on the side walls of the casing.

In accordance with the present invention, the positive terminal 37 is connected vertically to the positive post 35 through a first straight-through slot 65 correspondingly placed in the side wall of the main cover 60 and the negative terminal 48 is connected to the negative post 42 through a second straight through slot 66 placed on the main cover corresponding to the position of the negative terminal on the opposite side wall of the casing. The adhesive found generally useful in this invention is an adhesive that is a combination of an epoxy resin with a curing agent. The main cover 60 is then fixed onto the casing 10 and sealed thereto with an adhesive. Optionally, a top cover 90 is then placed over the main cover 60.

Preferably, the top of the positive and negative terminals 37 and 48 are lower than the top surface of the main cover 60 or top cover 90.

A method of manufacturing the battery of the present invention is also provided and illustrated by FIGS. 2 and 3. In a battery with a casing and a main cover, the method comprises:

arranging a set of positive and negative plates 31 and 42 with a positive plate alternating with a negative plate and separated by separators 21 in casing 10;

connecting all of the positive plates 31 in parallel to a positive post 35 and connecting all of the negative plates 42 in parallel to a negative post 46;

connecting the positive post to a positive terminal 37 position on the side wall of the casing 10 through a slot 65 located in the main cover in a position corresponding to the position of the positive terminal on the side wall of casing 10;

connecting the negative post to a negative terminal on the opposite side wall of the casing through a slot 66 located in the main cover in a position corresponding to the position of the negative terminal on the opposite side wall of casing 10;

fixing the main cover 60 provided with openings onto the casing 10 and sealed thereto with an adhesive; and closing the openings on the main cover with a valve.

The slots 65 and 66 are located in opposite side wall(s) of the main cover 60 in recesses 67 and 68 located in the main cover 60. The positive and negative terminals 37 and 48 of the battery may be vertically positioned at the top edge of the opposite side wall(s) of the casing 10, and go through slots 65 and 66 in the main cover when it is pressed onto the casing 10. Alternatively, terminals 37 and 48 may be made to bend slightly inward into recesses 67 and 68 located on the main cover.

The battery may be filled with an electrolyte through openings in the main cover after the main cover is sealed to the casing. The opening may be closed with a rubber valve.

By positioning the positive and negative terminals 37 and 48 in the side wall(s) of the casing 10, and ensuring that the tops of terminal 37 and terminal 48 are lower than the top surface of the main cover 60 or top cover 90, the possibility of short circuiting the battery by a fallen metal object on the top of the battery is eliminated.

The battery of the present invention is characterized by several outstanding advantages. The possibility of short circuits caused by a fallen metal object on top of the battery is eliminated, thereby increasing safety in operation. Moreover, connections to the terminals are made easier and space for storage or installation of the battery is reduced.

Furthermore, with the present, only one step is needed to seal the battery, i.e. sealing the main cover to the casing.

The present invention is illustrated by the preferred embodiments described above. However, the scope of the invention is not to be limited thereby.

What is claimed is:

1. A method of producing a battery with a side flanking terminals, said battery having a main cover and a casing wherein all the positive plates are connected in parallel to a corresponding positive post and all the negative plates are connected in parallel to a corresponding negative post, the method being characterized by:

(a) fixing a positive terminal on one side wall of the casing and a negative terminal on the opposite wall of the casing, said positive terminal being connected to the positive post through a first slot set into a first recess provided on the main cover in a position corresponding to the positive terminal fixed on a first side wall of the casing and said negative terminal being connected to the negative post through a second slot set into a second recess provided on the main cover in a position corresponding to the negative terminal fixed on a second side wall of the casing opposite to that of the first side wall, both the top of the positive and negative terminals are below the top surface of the main cover;

(b) fixing the main cover with an opening for filling the battery with an electrolyte onto the casing and sealing the main cover to the casing with an adhesive; and closing the opening with a rubber valve; and (c) filling the battery with an electrolyte.

2. A method according to claim 1 wherein a top cover is placed over the main cover after it is sealed to the casing.

3. A battery filled with an electrolyte with side flanking terminals comprising a casing wherein a set of positive plates and a set of negative plates, with each positive plate and each negative plate alternatingly arranged and separated with a separator therebetween;

and wherein the set of the positive plates are connected in parallel to a positive post and wherein the set of negative plates are connected in parallel to a negative post characterized by:

a main cover with a first and second slot being set in a first and second recess respectively for sealing attachment to the casing with an adhesive;

a positive terminal placed on a first side wall of the casing and connected to the positive post through the first slot on the main cover, said first slot in a position corresponding to the positive terminal, said main cover having an opening for filling the battery with the electrolyte;

a negative terminal placed on a second side wall of the casing opposite to the first side wall and connected to the negative post through the second slot being set in a first recess on the main cover in a position corresponding to the negative terminal; and wherein the main cover is fixed onto the casing and sealed thereto with an adhesive.

4. A battery with side flanking terminals according to claim 3 wherein the positive and negative terminals are fixed vertically respectively on the top edge of the opposite side walls of the casing and connected respectively to the positive and negative posts through respective slots in the main cover.

5. A battery with side flanking terminals according to claim 3 further comprising a top cover over the main cover.

6. A battery with side flanking terminals according to claim 4 further comprising a top cover over the main cover.

7. A battery with side flanking terminals according to claim 5 wherein the positive and negative terminals are lower than the top surface of the main cover or the top cover.

8. A battery with side flanking terminals according to claim 6 wherein the positive and negative terminals are lower than the top surface of the main cover or the top cover.

9. A battery with side flanking terminals according to claim 1 wherein the positive and negative terminals are bent inward into the recesses on the main cover.

\* \* \* \* \*